United States Patent
Juneja

(10) Patent No.: US 12,218,989 B2
(45) Date of Patent: Feb. 4, 2025

(54) METHODS, SYSTEMS, AND COMPUTER READABLE MEDIA FOR TRIGGERING A SESSION INITIATION PROTOCOL (SIP) RE-INVITE MESSAGE

(71) Applicant: Oracle International Corporation, Redwood Shores, CA (US)

(72) Inventor: Rohit Juneja, Nepean (CA)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 0 days.

(21) Appl. No.: 17/508,338

(22) Filed: Oct. 22, 2021

(65) Prior Publication Data

US 2023/0130424 A1 Apr. 27, 2023

(51) Int. Cl.
| | |
|---|---|
| H04L 65/1104 | (2022.01) |
| H04L 65/1045 | (2022.01) |
| H04L 65/1069 | (2022.01) |
| H04L 65/1073 | (2022.01) |
| H04L 69/22 | (2022.01) |

(52) U.S. Cl.
CPC ...... *H04L 65/1104* (2022.05); *H04L 65/1045* (2022.05); *H04L 65/1069* (2013.01); *H04L 65/1073* (2013.01); *H04L 69/22* (2013.01)

(58) Field of Classification Search
CPC ............. H04L 65/1104; H04L 65/1045; H04L 65/1069; H04L 65/1073; H04L 69/22
See application file for complete search history.

(56) References Cited

U.S. PATENT DOCUMENTS 8,116,302 B1 * 2/2012 Robbins .............. H04L 65/1069
 379/32.01
8,570,853 B2 * 10/2013 Bakshi .................... H04L 12/66
 370/242

(Continued)

FOREIGN PATENT DOCUMENTS

CN 110913084 A * 3/2020 ......... H04L 65/1006
CN 110913084 B * 9/2021 ......... H04L 65/1006

(Continued)

OTHER PUBLICATIONS

Johnston et al., "Session Initiation Protocol (SIP) Basic Call Flow Examples," Network Working Group, Request for Comments 3665, pp. 1-94 (Dec. 2003).

(Continued)

*Primary Examiner* — Oleg Survillo
*Assistant Examiner* — Abdelbasst Talioua
(74) *Attorney, Agent, or Firm* — Jenkins, Taylor & Hunt, P.A.

(57) ABSTRACT

Methods, systems, and computer readable media for triggering a session initiation protocol (SIP) re-invite message are disclosed. One example method for triggering a SIP re-invite message occurs at a SIP node. The method comprises: determining that the SIP node is not needed as an intermediary node for facilitating SIP communications between a first SIP user agent and a second SIP user agent; generating a SIP message comprising information in a SIP extension header field for triggering an endpoint to generate a SIP re-invite message; and sending the SIP message toward the first SIP user agent.

20 Claims, 9 Drawing Sheets

(56) References Cited

U.S. PATENT DOCUMENTS

| | | | |
|---|---|---|---|
| 8,738,076 B1* | 5/2014 | Hitchcock | H04M 3/42102 |
| | | | 455/426.2 |
| 8,793,150 B1* | 7/2014 | Croak | H04L 43/50 |
| | | | 705/7.11 |
| 8,934,475 B1* | 1/2015 | Wu | H04L 65/1104 |
| | | | 370/352 |
| 9,369,497 B1* | 6/2016 | Allison, III | H04L 65/1069 |
| 9,473,452 B1* | 10/2016 | Judge | H04L 65/1046 |
| 9,973,529 B1* | 5/2018 | Bharrat | H04L 63/1416 |
| 10,361,953 B1* | 7/2019 | Bonn | H04L 45/74 |
| 10,674,011 B1* | 6/2020 | Ouimette | F16K 31/1266 |
| 10,819,755 B1* | 10/2020 | Asveren | H04L 61/2589 |
| 10,972,514 B2* | 4/2021 | Kotnis | H04L 65/1069 |
| 11,689,587 B2 | 6/2023 | Grover et al. | |
| 2003/0097447 A1* | 5/2003 | Johnston | H04L 63/0281 |
| | | | 709/227 |
| 2006/0146798 A1* | 7/2006 | Harton | H04L 65/1104 |
| | | | 370/352 |
| 2006/0268858 A1* | 11/2006 | Hagale | H04M 3/4286 |
| | | | 370/389 |
| 2007/0115932 A1* | 5/2007 | Yang | H04L 65/1083 |
| | | | 370/352 |
| 2007/0204155 A1* | 8/2007 | Dutta | H04W 36/0016 |
| | | | 713/168 |
| 2008/0052400 A1* | 2/2008 | Ekberg | H04L 65/1069 |
| | | | 709/227 |
| 2008/0098117 A1* | 4/2008 | Fukuhara | H04L 69/40 |
| | | | 709/227 |
| 2008/0181253 A1* | 7/2008 | Maes | H04L 65/1069 |
| | | | 370/466 |
| 2008/0225835 A1* | 9/2008 | Oda | H04L 65/1069 |
| | | | 370/352 |
| 2008/0240091 A1* | 10/2008 | Kesavan | H04L 65/1104 |
| | | | 370/389 |
| 2009/0006633 A1* | 1/2009 | Moore | H04L 65/1104 |
| | | | 709/228 |
| 2009/0185673 A1* | 7/2009 | Erhart | H04L 65/1083 |
| | | | 379/265.09 |
| 2010/0238928 A1* | 9/2010 | Prouvost | H04L 45/02 |
| | | | 370/392 |
| 2013/0163590 A1* | 6/2013 | Bouvet | H04L 65/102 |
| | | | 370/352 |
| 2014/0280720 A1* | 9/2014 | Bischoff | G06F 9/5072 |
| | | | 709/217 |
| 2015/0127709 A1* | 5/2015 | Pai | H04L 65/1104 |
| | | | 709/202 |
| 2015/0256562 A1* | 9/2015 | Noldus | H04L 65/1045 |
| | | | 370/352 |
| 2015/0358361 A1* | 12/2015 | Balasaygun | H04L 65/1069 |
| | | | 709/228 |
| 2015/0365532 A1* | 12/2015 | Ristock | H04M 7/006 |
| | | | 379/265.09 |
| 2016/0294913 A1* | 10/2016 | Jansson | H04L 65/1069 |
| 2016/0352838 A1* | 12/2016 | Larkin | H04L 45/243 |
| 2016/0360038 A1* | 12/2016 | Phelps | H04L 5/14 |
| 2016/0366189 A1* | 12/2016 | Hart | H04L 43/0811 |
| 2017/0251028 A1* | 8/2017 | Bollapalli | H04L 65/1036 |
| 2017/0272479 A1 | 9/2017 | Fritz | |
| 2017/0310823 A1* | 10/2017 | N | H04M 3/5141 |
| 2018/0063764 A1* | 3/2018 | Bollapalli | H04L 65/1069 |
| 2018/0077229 A1 | 3/2018 | Bharrat et al. | |
| 2018/0167420 A1* | 6/2018 | Shukla | H04L 65/1045 |
| 2020/0186574 A1* | 6/2020 | Amin | H04W 8/18 |
| 2020/0336516 A1* | 10/2020 | Stewart | H04M 3/56 |
| 2021/0306383 A1* | 9/2021 | Muravlyannikov | |
| | | | H04L 65/1069 |
| 2022/0232053 A1 | 7/2022 | Grover et al. | |

FOREIGN PATENT DOCUMENTS

| | | |
|---|---|---|
| EP | 4282147 A1 | 11/2023 |
| WO | WO 2022/159218 | 7/2022 |

OTHER PUBLICATIONS

Sparks, "The Session Initiation Protocol (SIP) Refer Method," Network Working Group, Request for Comments 3515, pp. 1-23 (Apr. 2003).

Notice of Allowance and Fee(s) Due for U.S. Appl. No. 17/152,731 (Feb. 6, 2023).

Non-Final Office Action for U.S. Appl. No. 17/152,731 (Oct. 14, 2022).

Notification of Transmittal of the International Search Report and the Written Opinion of the International Searching Authority, or the Declaration for International Application No. PCT/US2021/064109 (Apr. 5, 2022).

Rosenberg, J. et al., "RFC: 3261—SIP: Session Initiation Protocol," Standards Track, pp. 1-256, (Jun. 2002).

Oracle Communications Session Border Controller, Data Sheet, Version 1.03, pp. 1-9 (2020).

Sparks et al., "Session Initiation Protocol (SIP) Call Control—Transfer Status of This Memo," Network Working Group, Request for Comments: 5589, pp. 1-58 (Jun. 2009).

\* cited by examiner

METHODS, SYSTEMS, AND COMPUTER READABLE MEDIA FOR TRIGGERING A SESSION INITIATION PROTOCOL (SIP) RE-INVITE MESSAGE

TECHNICAL FIELD

The subject matter described here in relates to session initiation protocol (SIP) communications. More particularly, the subject matter described herein relates to methods, systems, and computer readable media for triggering a SIP re-invite message.

BACKGROUND

Session initiation protocol (SIP), specified in the Internet Engineering Task Force (IETF) RFC 3261, is used for call and session control of multimedia communication sessions between parties exchanging various forms of media, such as voice and video. A SIP network may include various SIP network elements for exchanging SIP messages for setting up, tearing down, and/or modifying SIP sessions. One such element includes a SIP user agent (UA). As used herein, a "SIP UA" or "UA" may refer to a logical network endpoint used to communicate SIP messages. A UA may perform the role of a user agent client (UAC), which sends SIP requests, or a user agent server (UAS), which receives requests and returns SIP responses. Other SIP elements, such as a SIP proxy or a session border controller (SBC), may also be involved. As used herein, a "SIP proxy" may refer to an intermediary device in a SIP network that acts as both a server and a client for the purpose of making requests on behalf of other clients and primarily plays the role of routing messages to one or more associated devices.

A notable concept in SIP is the use of transactions, dialogs, and calls. As used herein, a "SIP transaction" includes a request along with all associated responses up to a final (non-1xx) response. As used herein, a "SIP dialog" or "dialog" may refer to a peer-to-peer SIP relationship between two UAs that persists for some time. Generally, a dialog may include a collection of SIP transactions. A dialog may be established by SIP messages, such as a 2xx response to an INVITE request. As used herein, "calls" and "sessions" may be used interchangeably. A SIP call or session may include multiple dialogs. For example, a session may include multiple UAs communicating with one UAC. Such an example may result from forking which allows a single request message to be sent to and trigger response messages from multiple UAs. UAs typically attempt to establish a SIP dialog for facilitating sequencing and routing of messages between each other. UAs may manage state information for each established dialog, including information to uniquely identify a dialog.

SBCs may perform and/or forward signaling used to establish and tear down media sessions between UAs, including signaling used for performing call transfers. In some scenarios, an SBC may be removed from a media path, e.g., when UAs in a media session are located in the same network or realm after a call transfer. In these scenarios, SIP messaging usable for removing the SBC from the media path may result in communications issues, e.g., issues associated with message buffering, timing issues, and/or related race conditions.

SUMMARY

Methods, systems, and computer readable media for triggering a session initiation protocol (SIP) re-invite message are disclosed. One example method for triggering a SIP re-invite message occurs at a SIP node. The method comprises: determining that the SIP node is not needed as an intermediary node for facilitating SIP communications between a first SIP user agent and a second SIP user agent; generating a SIP message comprising information in a SIP extension header field for triggering an endpoint to generate a SIP re-invite message; and sending the SIP message toward the first SIP user agent.

In some embodiments involving one or more aspect of the subject matter described herein, the method for triggering a SIP re-invite message includes, at a second SIP node, receiving the SIP message including the header information and sending the SIP message toward the first SIP user agent.

In some embodiments involving one or more aspect of the subject matter described herein, the second SIP node sends the SIP message toward the first SIP user agent after determining that the header information is for triggering an endpoint to generate a SIP re-invite message and after determining that the second SIP node is not an endpoint In some embodiments involving one or more aspect of the subject matter described herein, the method for triggering a SIP re-invite message includes, at the first SIP user agent, receiving the SIP message including header information; determining that the header information is for triggering the endpoint to generate the SIP re-invite message; generating the SIP re-invite message; and sending the SIP re-invite message toward the second SIP user agent.

In some embodiments involving one or more aspect of the subject matter described herein, the method for triggering a SIP re-invite message includes, at the SIP node, receiving the SIP re-invite message; adding or modifying session description protocol (SDP) information in the SIP re-invite message; and sending the SIP re-invite message toward the second SIP user agent.

In some embodiments involving one or more aspect of the subject matter described herein, the SDP information includes an IP address associated with the SIP node for a media path between the first SIP user agent and the second SIP user agent.

In some embodiments involving one or more aspect of the subject matter described herein, determining that the SIP node is not needed as an intermediary node for facilitating SIP communications between the first SIP user agent and the second SIP user agent occurs after a media path characteristic of the SIP session changes.

In some embodiments involving one or more aspect of the subject matter described herein, determining that the SIP node is not needed as an intermediary node for facilitating SIP communications between the first SIP user agent and the second SIP user agent is related to an unattended call transfer or an attended call transfer, wherein a call leg is transferred from the second SIP user agent to a third SIP user agent that is in the same network as the first SIP user agent and wherein the SIP node is a session border controller.

In some embodiments involving one or more aspect of the subject matter described herein, the SIP message includes header information, payload information, a SIP header extension field, or a field value indicating that the SIP re-invite message is to be triggered.

In some embodiments involving one or more aspect of the subject matter described herein, the SIP node includes a SIP proxy, a session border controller (SBC), a SIP server, or a SIP back-to-back user agent (B2BUA).

One example system for triggering a SIP re-invite message includes a SIP node. The SIP node comprises a processor and a memory. The SIP node is configured for determining that the SIP node is not needed as an intermediary node for facilitating SIP communications between a first SIP user agent and a second SIP user agent; generating a SIP message including header information (e.g., information in a SIP extension header field) for triggering an endpoint to generate a SIP re-invite message; and sending the SIP message toward the first SIP user agent.

In some embodiments involving one or more aspect of the subject matter described herein, a second SIP node is configured for receiving the SIP message including the header information and sending the SIP message toward the first SIP user agent.

In some embodiments involving one or more aspect of the subject matter described herein, the second SIP node sends the SIP message toward the first SIP user agent after determining that the header information is for triggering an endpoint to generate a SIP re-invite message and after determining that the second SIP node is not an endpoint In some embodiments involving one or more aspect of the subject matter described herein, the first SIP user agent is configured for receiving the SIP message including header information; determining that the header information is for triggering the endpoint to generate the SIP re-invite message; generating the SIP re-invite message; and sending the SIP re-invite message toward the second SIP user agent.

In some embodiments involving one or more aspect of the subject matter described herein, the SIP node is configured for receiving the SIP re-invite message; adding or modifying SDP information in the SIP re-invite message; and sending the SIP re-invite message toward the second SIP user agent.

In some embodiments involving one or more aspect of the subject matter described herein, the SDP information includes an IP address associated with the SIP node for a media path between the first SIP user agent and the second SIP user agent.

In some embodiments involving one or more aspect of the subject matter described herein, determining that the SIP node is not needed as an intermediary node for facilitating SIP communications between the first SIP user agent and the second SIP user agent occurs after a media path characteristic of the SIP session changes.

In some embodiments involving one or more aspect of the subject matter described herein, determining that the SIP node is not needed as an intermediary node for facilitating SIP communications between the first SIP user agent and the second SIP user agent is related to an unattended call transfer or an attended call transfer, wherein a call leg is transferred from the second SIP user agent to a third SIP user agent that is in the same network as the first SIP user agent and wherein the SIP node is a session border controller.

In some embodiments involving one or more aspect of the subject matter described herein, wherein the SIP message includes header information, payload information, a SIP header extension field, or a field value indicating that the SIP re-invite message is to be triggered.

In some embodiments involving one or more aspect of the subject matter described herein, the SIP node includes a SIP proxy, an SBC, a SIP server, or a SIP B2BUA.

One example non-transitory computer readable medium has stored thereon executable instructions that when executed by at least one processor of at least one computer cause the at least one computer to perform operations at a SIP node including determining that the SIP node is not needed as an intermediary node for facilitating SIP communications between a first SIP user agent and a second SIP user agent; generating a SIP message including header information (e.g., information in a SIP extension header field) for triggering an endpoint to generate a SIP re-invite message; and sending the SIP message toward the first SIP user agent.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
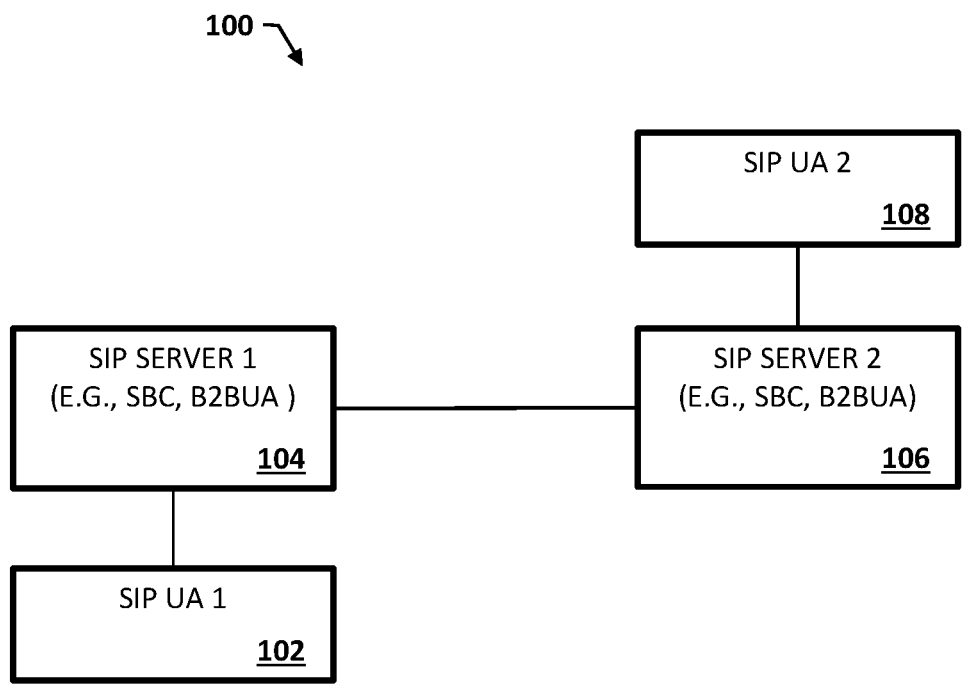
FIG. 1 is a network diagram illustrating an example session initiation protocol (SIP) network.

The subject matter described herein relates to methods, systems, and computer readable media for triggering a session initiation protocol (SIP) re-invite message. A SIP intermediary node (e.g., a SIP proxy, a session border controller (SBC), a SIP server, or a SIP back-to-back user agent (B2BUA)) may perform and/or forward signaling used to establish and tear down media sessions between UAs, including signaling used for performing call transfers. In some scenarios, a SIP intermediary node may initiate messaging to be removed from a media path, e.g., when UAs in a media session are located in the same network or realm after a call transfer. In these scenarios, conventional messaging for removing the SIP intermediary node from the media path may involve the SIP intermediary node sending a SIP re-invite message to one or more endpoints. However, since another endpoint involved in the call may also generate and send a SIP invite message (e.g., because its own session description protocol (SDP) information has changed) to the SIP intermediary node prior to the first SIP re-invite process being completed, various communications issues may result, e.g., issues associated with message buffering, timing issues, back and forth messaging loops, or related race conditions.

In accordance with some aspects of the subject matter described herein, methods, systems, mechanisms, and/or techniques for allowing a SIP intermediary node to trigger a SIP re-invite message from an endpoint. For example, in accordance with aspects described herein, a SIP element or node (e.g., an SBC or a UA) may be configured (e.g., via programming logic) for supporting header information (e.g., a SIP extension header field and/or a related field value) and/or other information (e.g., payload information) usable for triggering an endpoint to send a SIP re-invite message. In this example, the SIP header extension may involve a custom header parameter or field (e.g., an "X-SIP_ReInvitee_Trigger" field) that indicates whether an endpoint should send a SIP re-invite message toward a destination.

In accordance with some aspects of the subject matter described herein, supporting a SIP header extension usable for triggering an endpoint to send a SIP re-invite message may include functionality for generating a SIP message containing a custom header parameter or field usable for triggering an endpoint to send a SIP re-invite message, functionality for inserting the custom header parameter or field into an existing SIP message, and/or functionality for appropriately reacting or responding to a SIP message containing a custom header parameter or field usable for triggering an endpoint to send a SIP re-invite message. For example, a non-endpoint element (e.g., a SBC or a SIP intermediary node) that supports "X-SIP_ReInvite_Trigger" fields may receive a SIP message containing the "X-SIP_ReInvite_Trigger" field (e.g., with an 'enable' field value) and, in response, the non-endpoint element may send or forward the SIP message onward, e.g., toward an endpoint. In another example, an endpoint (e.g., a SIP UA) that supports "X-SIP_ReInvite_Trigger" fields may receive a SIP message containing an "X-SIP_ReInvite_Trigger" field (e.g., with an 'enable' field value) and, in response, the endpoint may generate and send a SIP re-invite message toward a destination.

In accordance with some aspects of the subject matter described herein, a SIP intermediary node configured for triggering a SIP re-invite message from an endpoint may be further configured for receiving and identifying the SIP re-invite message that it triggered. In such embodiments, the SIP intermediary node may be configured for inserting or adding SDP information or other information associated with the SIP intermediary node the SIP re-invite message before forwarding the SIP re-invite message onward, e.g., toward another endpoint. In such embodiments, by adding this information to this SIP re-invite message, the SIP intermediary node may avoid generating and sending a separate SIP re-invite message to that endpoint.

Reference will now be made in detail to various embodiments of the subject matter described herein, examples of which are illustrated in the accompanying drawings. Wherever possible, the same reference numbers will be used throughout the drawings to refer to the same or like parts.

FIG. 1 is a network diagram illustrating an example SIP network 100. SIP network 100 may include various SIP network elements for exchanging SIP messages for setting up, tearing down, and/or modifying SIP sessions. As depicted in FIG. 1, SIP network 100 includes a SIP user agent (UA) 1 102, a SIP server 1 104, a SIP server 2 106, and a SIP UA 2 108. Each of SIP UA 1 102 and SIP UA 2 108 may be a logical or physical network endpoint used to communicate SIP messages. Each of SIP UA 1 102 and SIP UA 2 108 may perform the role of a user agent client (UAC), which sends SIP requests, or a user agent server (UAS), which receives requests and returns SIP responses. Each of SIP server 1 104 and SIP server 2 106 may represent a physical or logical SIP element or node for facilitating communications between SIP endpoints, e.g., between SIP UA 1 102 and SIP UA 2 108. For example, SIP server 1 104 and/or SIP server 2 106 may act as an intermediary element in SIP network 100 and may act as both a server and a client. In this example, SIP server 1 104 and/or SIP server 2 106 may include functionality for making requests on behalf of other clients and/or routing messages to one or more associated devices.

In some embodiments, SIP server 1 104 and/or SIP server 2 106 may represent a session border controller (SBC), a SIP proxy, back to back user agent (B2BUA), or a SIP intermediary node. In some embodiments, SIP server 1 104 and/or SIP server 2 106 may be a network element deployed in SIP network 100 to monitor and control signaling and media streams in an Internet telephony call. Since various signaling messages may pass through SIP server 1 104 and/or SIP server 2 106, SIP server 1 104 and/or SIP server 2 106 may inherently supports the SIP call transfer procedure by transparently routing the call related signaling to and from SIP UAs.

As depicted in FIG. 1, a SIP session or call may be established between SIP UA 1 102 and SIP UA 2 108 and may utilize intermediary nodes a media path that includes a call leg between SIP UA 1 102 and SIP server 1 104, a call leg between SIP server 1 104 and SIP server 2 106, and a call leg between SIP server 2 106 and SIP UA 2 108.

Call transfer or call forwarding is a mechanism for reallocating a telephone call from one phone to another phone. A transfer event may involve three parties, which in VoIP or SIP networks may also be referred to as UAs. The three parties are:

transferor: the party initiating the call transfer;
    transferee: the party whose call or session is being connected with or transferred to the transfer target; and
    transfer target: the new party being introduced into a call with the transferee.

In the case of SIP or VoIP calls, call transfer can be achieved using the session initiation protocol (SIP) REFER method. The SIP REFER method is defined in Internet Engineering Task Force (IETF) Request for Comments (RFC) 3515. One of the applications of the SIP REFER method is call transfer. For example, IETF RFC 3515 states:

[The SIP REFER method] can be used to enable many applications, including Call Transfer. For instance, if Alice is in a call with Bob, and decides Bob needs to talk to Carol, Alice can instruct her SIP user agent (UA) to send a SIP REFER request to Bob's UA providing Carol's SIP Contact information. Assuming Bob has given it permission, Bob's UA will attempt to call Carol using that contact. Bob's UA will then report whether it succeeded in reaching the contact to Alice's UA.

There may be two primary ways of transferring a call using the SIP REFER method: a blind or unattended call transfer and an attended call transfer. In blind or unattended call transfer, the transferor provides the transfer target's contact information for the transferee to directly initiate a call with the transfer target. In attended call transfer, the transferor places the transferee on hold, establishes a call with the transfer target to alert the transfer target to the impending transfer, places the target on hold, then proceeds with the transfer by sending a SIP REFER message to the transferee with a Replaces header field in the Refer-To header. The Replaces header field information is then conveyed by the transferee to the transfer target as part of the INVITE request for the new call. The transfer target uses this information to identify its session with the transferor and correlate the session with the new call.

Pursuant to existing SIP procedures (e.g., SIP IP call transfer procedures), a SIP intermediary node involved in a SIP session or call may generate a re-invite message for one or more endpoints due to certain event or conditions. However, during the re-invite process for a particular endpoint, another endpoint may send a separate SIP re-invite message containing new or updated SDP information to the same SIP intermediary node. Such a scenario may cause queuing at the SIP intermediary node which can result in stale messages that need to be resent. Also, messaging loops associated with exchanging SDP information for both ends may result, especially if SDP information changes at one endpoint cause another endpoint to change its SDP information.

As will be described in detail below, aspects of the subject matter described herein include methods, systems, mechanisms, and/or techniques for supporting a SIP header extension (e.g., a SIP header field) usable for triggering a SIP re-invite message from an endpoint. For example, in lieu of a SIP intermediary node sending a SIP re-invite message to an endpoint when removing itself from an established media path, the SIP intermediary node may provide relevant session information along with a SIP header field or parameter for triggering an endpoint to generate and send the SIP re-invite message. In this example, the endpoint can provide its SDP information in the SIP re-invite message toward the other endpoint, thereby eliminating or mitigating various issues that can result if the SIP intermediary node had originated the SIP re-invite message.

It will be appreciated that FIG. 1 and its related description are for illustrative purposes and that each of nodes and entities described above may include additional and/or different modules, components, or functionality.

Figure 2:
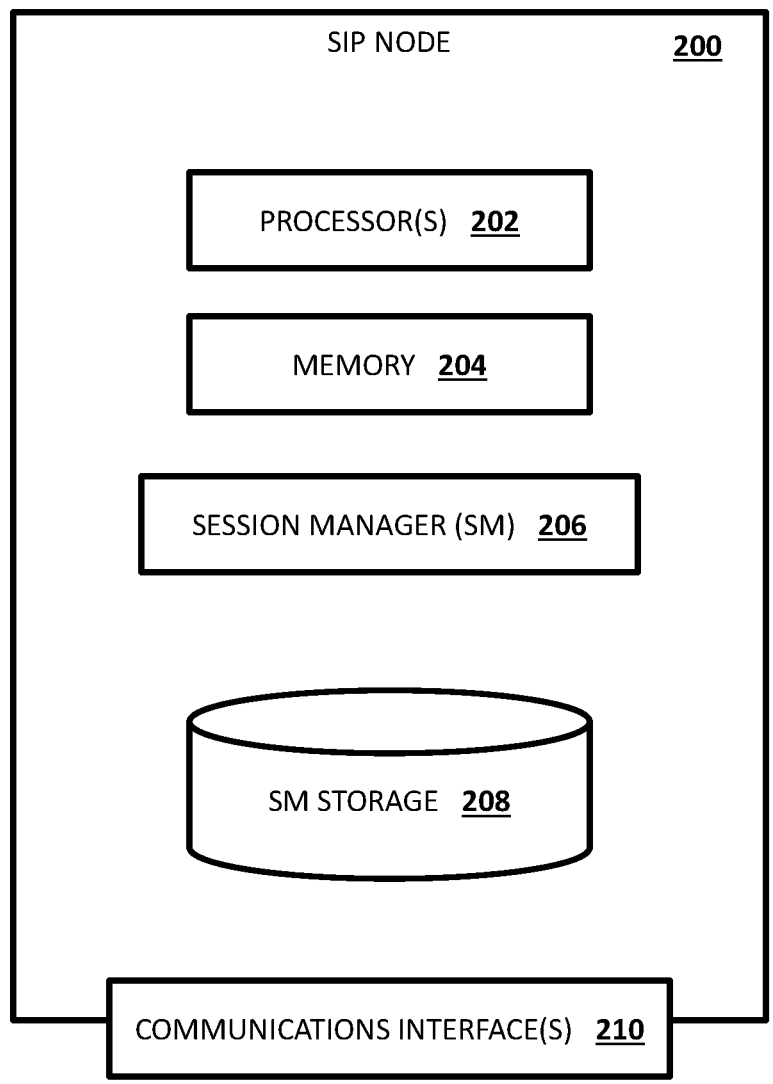
FIG. 2 is a block diagram illustrating an example SIP node for generating a SIP message for triggering a SIP re-invite message.

FIG. 2 is a block diagram illustrating an example SIP node for generating a SIP message for triggering a SIP re-invite message. SIP node 200 may represent any suitable entity or entities (e.g., one or more node(s), device(s), or computing platform(s)) for performing various aspects associated with supporting a SIP header extension or other information for triggering an endpoint (e.g., SIP UA 1 102) to send a SIP re-invite message, e.g., by an intermediary SIP node, e.g., SIP server 1 104. In some embodiments, SIP node 200 may represent or include SIP UA 1 102, SIP server 1 104, SIP server 2 106, and SIP UA 2 108.

Referring to FIG. 2, SIP node 200 may include one or more processor(s) 202, a memory 204, a session manager (SM) 206, an SM storage 208, and communications interface(s) 210 for sending or receiving SIP messages or other messages. In some embodiments, processor(s) 202 may include a microprocessor, central processing unit (CPU), or any other like hardware based processing unit. In some embodiments, SM 206 or related logic can be stored in memory 204, which can include random access memory (RAM), read only memory (ROM), optical read/write memory, cache memory, magnetic read/write memory, flash memory, or any other non-transitory computer readable medium.

In some embodiments, processor(s) 202 and memory 204 may be used to execute and manage the operation of SM 206. In some embodiments, SM storage 208 may include a storage medium or storage unit (e.g., a flash drive or a data store) configured to store data accessible by processor(s) 202 or SM 206. For example, SM storage 208 may include logic or related information for facilitating SIP communications, e.g., call setups, call teardowns, call transfers, and/or call related procedures. In some embodiments, SM storage 208 may include logic or related information for supporting various SIP header extensions or related aspects.

SIP node 200 may include SM 206. SM 206 may be any suitable entity (e.g., software executing on at least one processor) for performing one or more aspects associated with supporting SIP messages including header information (e.g., a SIP extension header field or a header value) and/or other information (e.g., payload information) for triggering an endpoint (e.g., SIP UA 1 102) to send a SIP re-invite message. For example, a SIP extension header field for triggering an endpoint to send a SIP re-invite message may be referred to as an "X-SIP_ReInvite_Trigger" field and may use Boolean values (e.g., true or false) or other values (e.g., enable or disable) for indicating whether an endpoint should sent send a SIP re-invite message. In this example, when the "X-SIP_ReInvite_Trigger" field indicates true or enable, SIP node 200 or other elements that support the SIP extension header field may react appropriately, e.g., depending on whether the processing node is an endpoint or an intermediary node.

In some embodiments, SIP node 200 or SM 206 therein may be configured (e.g., via programming logic) for adding or inserting header information (e.g., a SIP extension header field or a field value) or payload information for triggering an endpoint (e.g., SIP UA 1 102) to send a SIP re-invite message.

In some embodiments, SIP node 200 or SM 206 therein may be configured (e.g., via programming logic) for determining whether a SIP message that includes information for triggering an endpoint (e.g., SIP UA 1 102) to send a SIP re-invite message and, if so, determining how to react or respond. For example, if SIP node 200 is not an endpoint (e.g., a SIP UA) for a SIP session or call, SIP node 200 or SM 206 therein may be configured (e.g., via programming logic) for sending or forwarding onward a received SIP message that includes information for triggering an endpoint (e.g., SIP UA 1 102) to send a SIP re-invite message. In another example, if SIP node 200 is an endpoint for a SIP session or call, SIP node 200 or SM 206 therein may be configured (e.g., via programming logic) for generating and sending a SIP re-invite message to an appropriate destination and/or node.

In some embodiments, SIP node 200 or SM 206 therein may be configured (e.g., via programming logic) for identifying a SIP re-invite message from an endpoint that it triggered and inserting or adding SDP information or other information associated with SIP node 200 prior to forwarding the SIP re-invite message onward, e.g., toward another endpoint. In such embodiments, by adding this information to this SIP re-invite message, SIP node 200 may avoid generating and sending a separate SIP re-invite message to that endpoint.

In some embodiments, SIP node 200 or SM 206 therein may be configured (e.g., via programming logic) for utilizing various authentication mechanisms, e.g., to avoid unauthorized triggering of a SIP re-invite message from an endpoint. For example, SIP node 200 or SM 206 therein may utilize SIPS or another authentication mechanism to prevent or mitigate a man in the middle attack or another attack.

It will be appreciated that FIG. 2 and its related description are for illustrative purposes and that SIP node 200 may include additional and/or different modules, components, or functionality.

Figure 3:
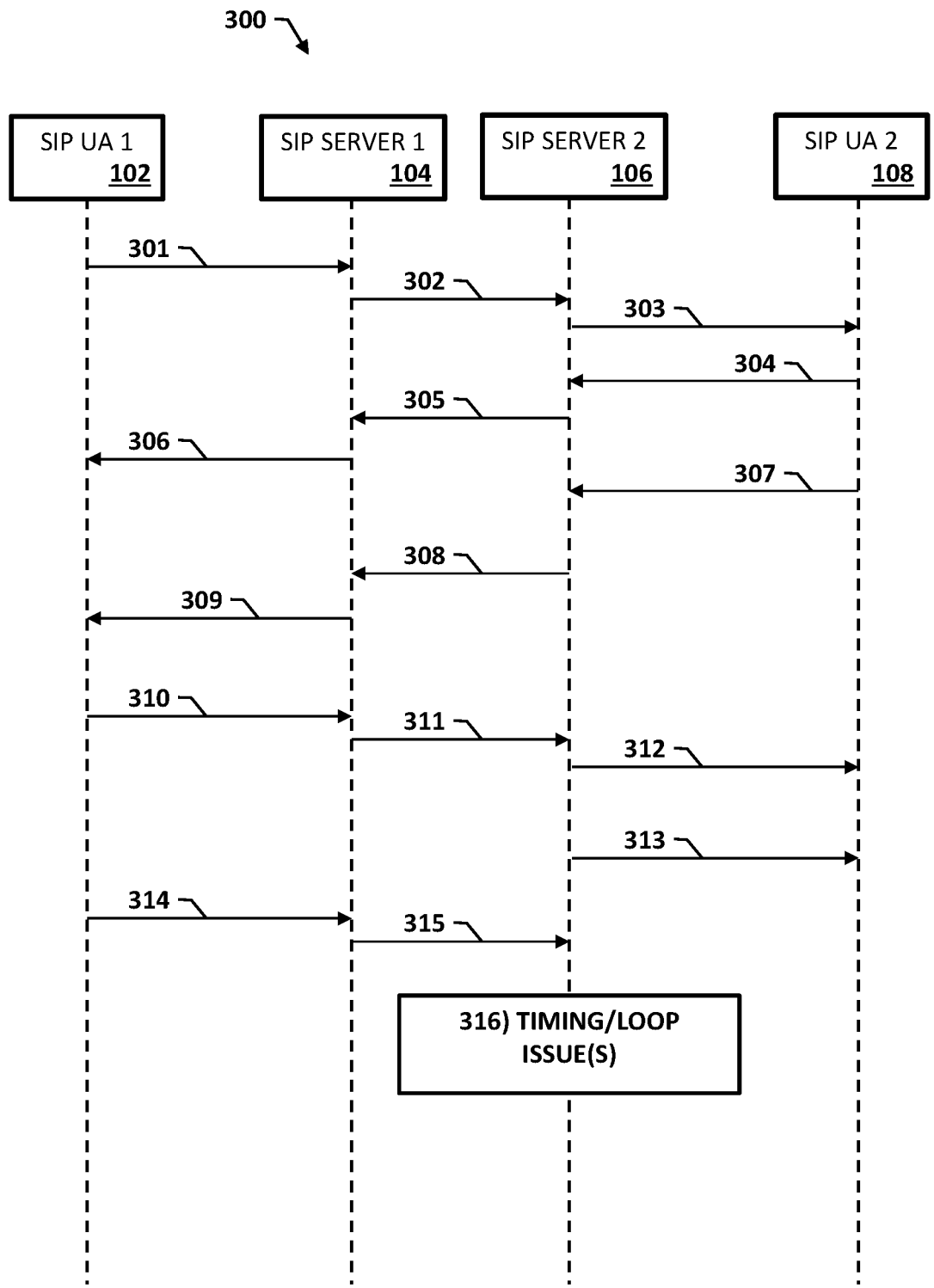
FIG. 3 is a message flow diagram illustrating a scenario involving media path changes during a SIP session setup.

FIG. 3 is a message flow diagram illustrating a scenario 300 involving media path changes during a SIP session setup. Scenario 300 may involve various SIP nodes, including SIP UA 1 102, SIP server 1 104, SIP server 2 106, and SIP UA 2 108. For example, during scenario 300, media path characteristics (e.g., a media IP address and/or port number associated with SIP UA 2 108) may change during a SIP session or call setup one or more intermediary SIP nodes (e.g., SIP server 1 104, SIP server 2 106). In this example, the media path changes may cause SIP server 2 106 to send a SIP re-invite message SIP UA 2 108.

In some embodiments, scenario 300 may cause or trigger a race condition or a messaging loop. For example, after sending a SIP re-invite message to SIP UA 2 108 and prior to receiving a response to the SIP re-invite message from SIP UA 2 108, SIP server 2 106 may receive a second SIP re-invite message originating SIP UA 1 102. SIP server 2 106 may be configured to buffer the second SIP re-invite message until a response to the first SIP re-invite message is received. If the second SIP-re-invite message becomes stale before being delivered and/or if SIP server 2 106 changes a relevant media IP address again before the second SIP-re-invite message is delivered, additional messaging (e.g., a new SIP re-invite message and subsequent messages) may be needed before a media path is successfully established between SIP UA 1 102 and SIP UA 2 108, e.g., via SIP server 1 104 and SIP server 2 106.

Referring to FIG. 3, in step 301, a SIP INVITE message for establishing a SIP session or call between SIP UA 1 102 and SIP UA 2 108 may be sent from SIP UA 1 102. The SIP message may provide SDP information associated with SIP UA 1 102.

In step 302, the SIP INVITE message may be received by SIP Server 1 104 and forwarded or sent to SIP server 2 106.

In step 303, the SIP INVITE message may be received by SIP Server 2 104 and forwarded or sent to SIP UA 2 108.

In step 304, in response to the SIP INVITE message, SIP UA 2 108 may send a SIP response message indicating a ringing status toward SIP UA 1 102.

In step 305, the SIP response message may be received by SIP Server 2 106 and forwarded or sent to SIP server 1 104.

In step 306, the SIP response message may be received by SIP Server 1 104 and forwarded or sent to SIP UA 1 102.

In step 307, SIP UA 2 108 may send a SIP OK message indicating a successful status toward SIP UA 1 102.

In step 308, the SIP OK message may be received by SIP Server 2 106 and forwarded or sent to SIP server 1 104.

In step 309, the SIP OK message may be received by SIP Server 1 104 and forwarded or sent to SIP UA 1 102.

In step 310, a SIP ACK message indicating acknowledgement of the SIP OK message and related status may be sent from SIP UA 1 102 to SIP server 1 104.

In step 311, the SIP ACK message may be sent from SIP server 1 104 to SIP server 2 106.

In step 312, the SIP ACK message may be sent from SIP server 2 106 to SIP UA 2 108.

In some embodiments, SIP server 2 106 may determine that a SIP re-invite message is needed. For example, after receiving SDP information associated with SIP UA 2 108 in a received SIP OK message, SIP server 2 106 may determine that a media path IP address at SIP server 2 106 for communicating with SIP UA 2 108 needs to change.

In step 313, SIP server 2 106 may generate a SIP re-invite message with updated SDP information associated with SIP server 2 106 and send the SIP re-invite message to SIP UA 2 108.

In some embodiments, e.g., without provocation by SIP server 2 106 or another node, SIP UA 1 102 may generate a SIP re-invite message (e.g., in response to a need to update or change SDP information, like a media IP address). In such embodiments, while SIP server 2 106 is waiting on a response to its own SIP re-invite message, this SIP re-invite message may be sent or forwarded to SIP server 2 106 for delivery to SIP UA 2 108.

In step 314, SIP UA 1 102 may generate a SIP re-invite message with updated SDP information associated with SIP UA 1 102 and may be sent from SIP UA 1 102 to SIP server 1 104.

In step 315, the SIP re-invite message may be forwarded or sent from SIP server 1 104 to SIP server 2 106.

In step 316, messaging loops or timing issues may occur that hinder successfully establishing a media path between SIP UA 1 102 and SIP UA 2 108, e.g., via SIP server 1 104 and SIP server 2 106. For example, while SIP server 2 106 is waiting on a response to its own SIP re-invite message, the SIP re-invite message originating from SIP UA 1 102 may be received and buffered (e.g., not forwarded onward to SIP UA 2 108) until SIP server 2 106 receives a response from SIP UA 2 108 regarding its own SIP re-invite message. In this example, various SIP nodes may change SDP information or media path characteristics while messages are buffered, thereby resulting in additional messaging being needed (e.g., SIP re-invite messages and related messages being resent).

It will be appreciated that FIG. 3 is for illustrative purposes and that different and/or additional messages and/or actions may be used. It will also be appreciated that various messages and/or actions described herein regarding scenario 300 may occur in a different order or sequence.

Figure 4:
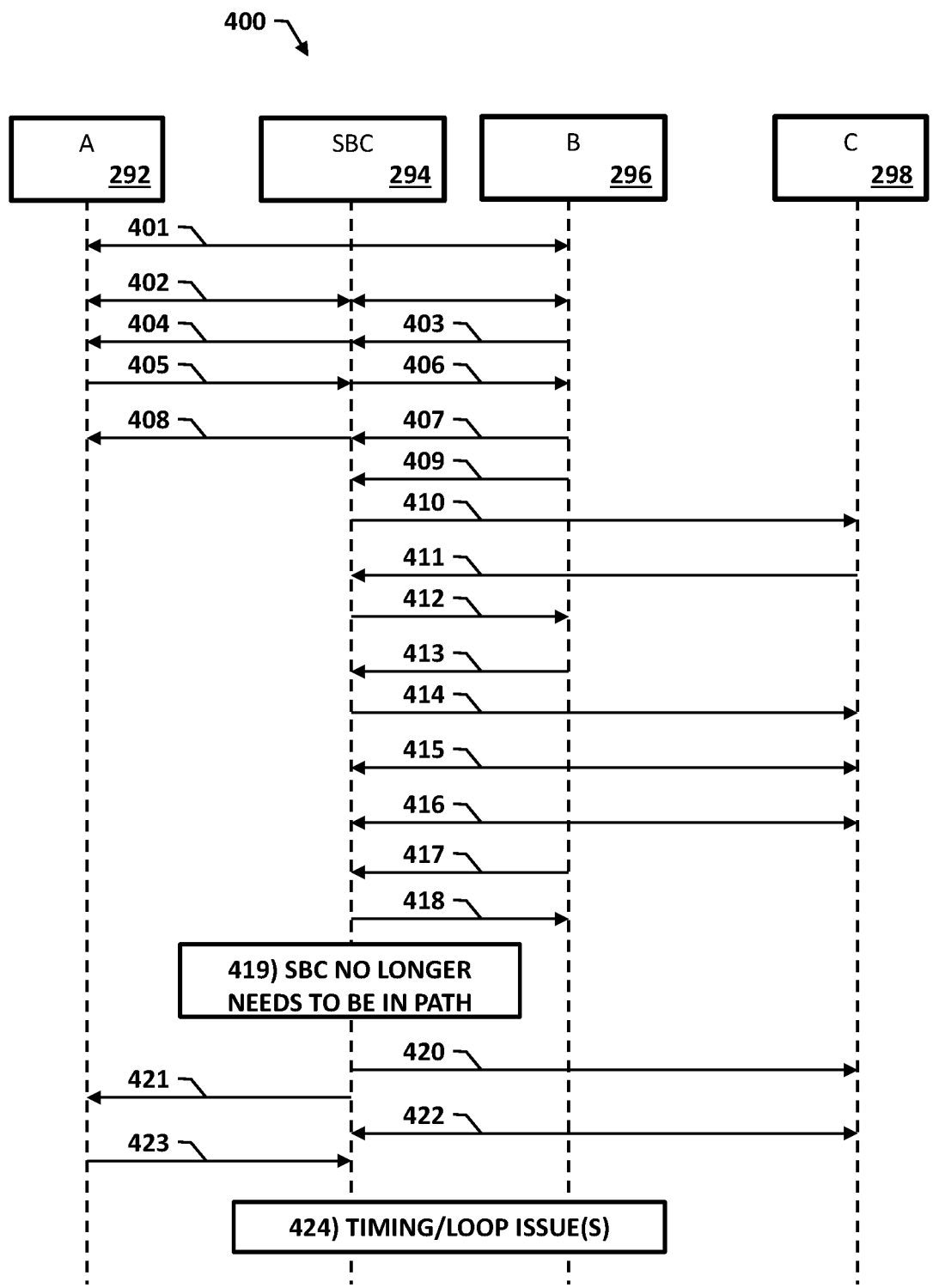
FIG. 4 is a message flow diagram illustrating an attended call transfer scenario during a SIP session.

FIG. 4 is a message flow diagram illustrating an attended call transfer scenario 400 during a SIP session. Attended call transfer scenario 400 may involve various SIP nodes, including A 292, SBC 294, B 296, and C 298. Each of A 292, B 296, and C 298 may represent a SIP UA (e.g., SIP UA 1 102 or SIP UA 2 108) or a SIP endpoint and may include various functionality described above with regard to SIP UA 1 102 or SIP UA 2 108. SBC 294 may represent an SBC, a SIP server, a SIP B2BUA, or other SIP entity and may include various functionality described above with regard to SIP server 1 102 or SIP server 2 106.

In some embodiments, during scenario 400, SBC 294 may determine that it is no longer needed in the media path and may send a SIP re-invite message to C 298 that includes SDP information associated with A 292 and may also send a SIP re-invite message to A 292 that includes SDP information associated with C 292.

In some embodiments, scenario 400 may cause or trigger a race condition or a messaging loop. For example, after SBC 294 sends SIP re-invite messages to A 292 and C 298, A 292 may respond with a SIP OK message indicating a different port number for the call (e.g., a port number different from the port number used in the previous established call). In response to the different port number, SBC 294 may generate another SIP re-invite message to C 298 that includes the updated SDP information associated with A 292. In this example, e.g., when either endpoint changes SDP information, additional messaging (e.g., a new SIP re-invite message and subsequent messages) may be needed before a media path is successfully established between A 292 and C 298.

Referring to FIG. 4, in step 401, various call setup related messages (e.g., a SIP invite message, a SIP OK message, a SIP ACK message, etc.) may be sent between A 292, SBC 294, and C 298.

In step 402, a call may be established involving a media path from A 292 to SBC 294 and from SBC 294 to B 296.

In step 403, after the call is established, B 296 acting as the transferor may initiate an attended call transfer by sending a SIP INVITE message to SBC 294 for placing the transferee, A 292, on hold.

In step 404, the SIP INVITE message for placing A 292 on hold may be sent or forwarded from SBC 294 to A 292.

In step 405, a SIP OK message for indicating that A 292 is successfully on hold may be sent from A 292 to SBC 294.

In step 406, the SIP OK message may be sent or forwarded from SBC 294 to B 296.

In step 407, a SIP ACK message indicating acknowledgement of the SIP OK message and related status may be sent from B 296 to SBC 294.

In step 408, the SIP ACK message may be sent or forwarded from SBC 294 to A 292.

In step 409, B 296 may initiate establishing a call with the transfer target, C 298, (e.g., to alert C 298 about the impending call transfer) by sending a SIP INVITE message to SBC 294 for connecting B 296 to C 298.

In step 410, the SIP INVITE message may be sent or forwarded from SBC 294 to C 298.

In step 411, a SIP OK message indicating a successful status may be sent from C 298 to SBC 294.

In step 412, the SIP OK message may be sent or forwarded from SBC 294 to B 296.

In step 413, a SIP ACK message indicating acknowledgement of the SIP OK message and related status may be sent from B 296 to SBC 294.

In step 414, the SIP ACK message may be sent or forwarded from SBC 294 to C 298.

In step 415, a call may be established involving a media path from SBC 294 to C 298.

In step 416, messaging (e.g., a SIP invite message, a SIP OK message, a SIP ACK message, etc.) may occur for placing the transfer target, C 298, on hold.

In step 417, after C 298 is on hold, B 296 may send a SIP REFER request message for transferring a call from B 296 to C 298. The SIP REFER message may include a Replaces header with a Refer-to field indicating C 298 and a Refer-by field indicating B 296.

In step 418, a SIP REFER response message indicating that the REFER request was accepted may be sent from SBC 294 to B 296.

In step 419, SBC 294 may determine that it no longer needs to be in the media path between the transfer target (e.g., C 298) and the transferee (e.g., A 292). For example, SBC 294 may determine that C 298 and A 292 is within the same network, domain, or realm. In this example, after determining that SBC 294 is no longer needed in the media path between A 292 and C 298, SBC 294 may send a respective SIP re-invite message to A 292 and C 298 so that a new media path between A 292 and C 298 without SBC 294 can be established.

In step 420, SBC 294 may generate and send a SIP re-invite message to C 298 that includes SDP information associated with A 292.

In step 421, e.g., concurrently with step 420, SBC 294 may generate and send another SIP re-invite message to A 292 that includes SDP information associated with C 298.

In step 422, call leg setup messaging (e.g., a SIP OK message, a SIP ACK message, etc.) involving C 298 may occur.

In step 423, a SIP OK message indicating a successful status may be sent from A 292 to SBC 294. The SIP OK message may include updated SDP information (e.g., a new or different media port number) associated with A 292.

In step 424, messaging loops or timing issues may occur that hinder successfully establishing a media path between A 292 and C 298. For example, after SBC 294 sends SIP re-invite messages to A 292 and C 298, A 292 may respond with a SIP OK message indicating updated SDP information associated with A 292. In response to this updated SDP information, SBC 294 may generate another SIP re-invite message to C 298 that includes the updated SDP information associated with A 292. The additional SIP re-invite message may result in a corresponding SIP OK message and SIP ACK message being exchanged. Similar messaging can occur multiple times, e.g., if an endpoint keeps updating their SDP information in response to another endpoint's updated SDP information.

It will be appreciated that FIG. 4 is for illustrative purposes and that different and/or additional messages and/or actions may be used. It will also be appreciated that various messages and/or actions described herein regarding attended call transfer scenario 400 may occur in a different order or sequence.

Figure 5:
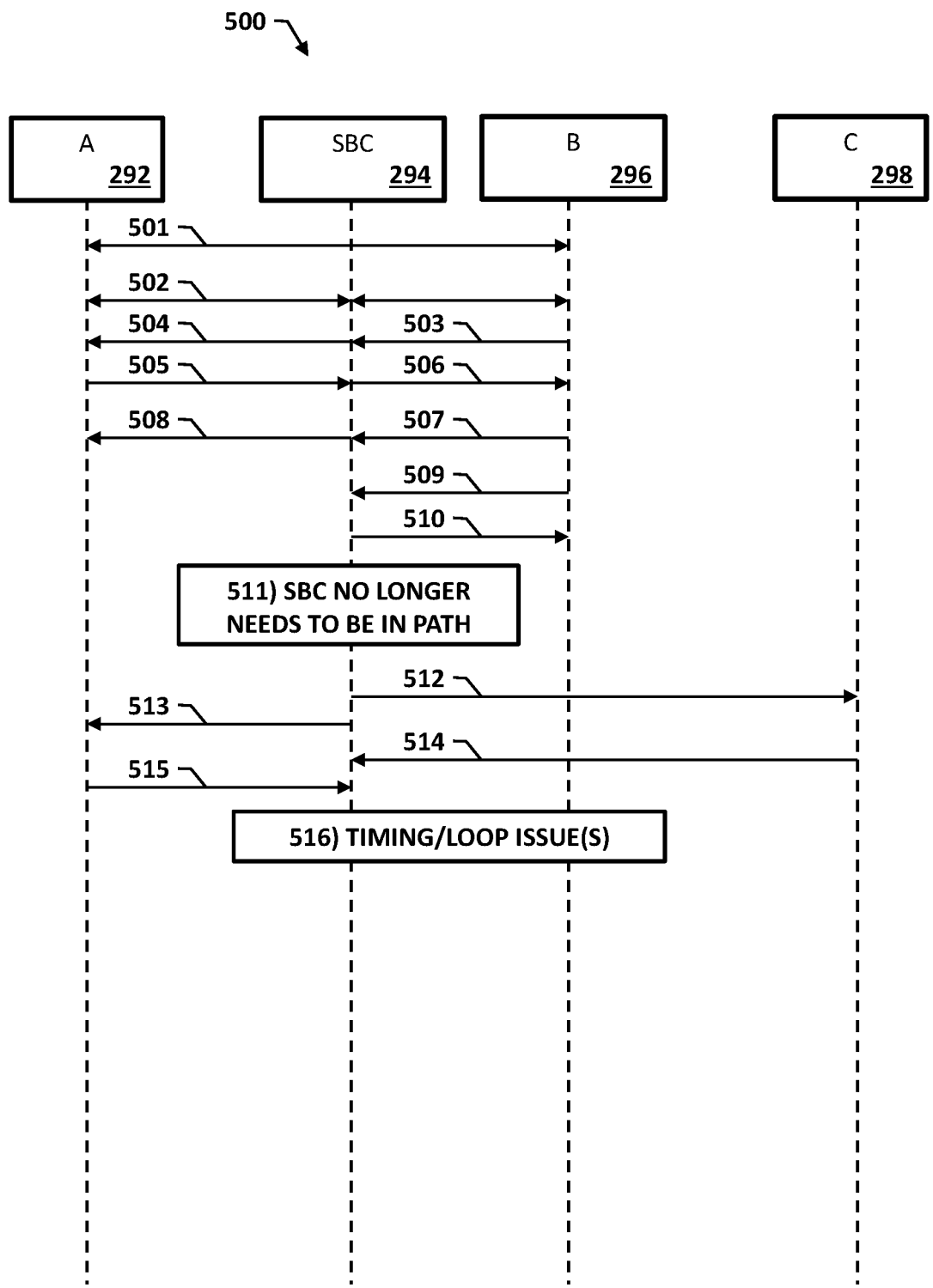
FIG. 5 is a message flow diagram illustrating an unattended call transfer scenario during a SIP session.

FIG. 5 is a message flow diagram illustrating an unattended call transfer scenario 500 during a SIP session. Unattended call transfer scenario 500 may involve various SIP nodes, including A 292, SBC 294, B 296, and C 298. Each of A 292, B 296, and C 298 me represent a SIP UA (e.g., SIP UA 1 102 or SIP UA 2 108) or a SIP endpoint and may include various functionality described above with regard to SIP UA 1 102 or SIP UA 2 108. SBC 294 may represent a SIP intermediary node for facilitating SIP communications between endpoints, e.g., endpoints may be located in different realms or networks. In some embodiments, SBC 294 may include various functionality described above with regard to SIP server 1 102 or SIP server 2 106.

In some embodiments, during scenario 500, SBC 294 may determine that it is no longer needed in the media path and may send a SIP re-invite message to C 298 that includes SDP information associated with A 292 and may also send a SIP re-invite message to A 292 that includes SDP information associated with C 292.

In some embodiments, scenario 500 may cause or trigger a race condition or a messaging loop. For example, after SBC 294 sends SIP re-invite messages to A 292 and C 298, A 292 may respond with a SIP OK message indicating a different port number for the call (e.g., a port number different from the port number used in the previous established call). In response to the different port number, SBC 294 may generate another SIP re-invite message to C 298 that includes the updated SDP information associated with A 292. In this example, e.g., when either endpoint changes SDP information, additional messaging (e.g., a new SIP re-invite message and subsequent messages) may be needed before a media path is successfully established between A 292 and C 298.

Referring to FIG. 5, in step 501, various call setup related messages (e.g., a SIP invite message, a SIP OK message, a SIP ACK message, etc.) may be sent between A 292, SBC 294, and C 298.

In step 502, a call may be established involving a media path from A 292 to SBC 294 and from SBC 294 to B 296.

In step 503, after the call is established, B 296 acting as the transferor may initiate an unattended call transfer by sending a SIP INVITE message to SBC 294 for placing the transferee, A 292, on hold.

In step 504, the SIP INVITE message for placing A 292 on hold may be sent or forwarded from SBC 294 to A 292.

In step 505, a SIP OK message for indicating that A 292 is successfully on hold may be sent from A 292 to SBC 294.

In step 506, the SIP OK message may be sent or forwarded from SBC 294 to B 296.

In step 507, a SIP ACK message indicating acknowledgement of the SIP OK message and related status may be sent from B 296 to SBC 294.

In step 508, the SIP ACK message may be sent or forwarded from SBC 294 to A 292.

In step 509, after A 292 is on hold, B 296 may send a SIP REFER request message for transferring a call from B 296 to C 298. The SIP REFER message may include a Replaces header with a Refer-to field indicating C 298 and a Refer-by field indicating B 296.

In step 510, a SIP REFER response message indicating that the REFER request was accepted may be sent from SBC 294 to B 296.

In step 511, SBC 294 may determine that it no longer needs to be in the media path between the transfer target (e.g., C 298) and the transferee (e.g., A 292). For example, SBC 294 may determine that C 298 and A 292 is within the same network, domain, or realm. In this example, after determining that SBC 294 is no longer needed in the media path between A 292 and C 298, SBC 294 may send a respective SIP re-invite message to A 292 and C 298 so that a new media path between A 292 and C 298 without SBC 294 can be established.

In step 512, SBC 294 may generate and send a SIP re-invite message to C 298 that includes SDP information associated with A 292.

In step 513, e.g., concurrently with step 512, SBC 294 may generate and send another SIP re-invite message to A 292 that includes SDP information associated with C 298.

In step 514, call leg setup messaging (e.g., a SIP OK message, a SIP ACK message, etc.) involving C 298 may occur.

In step 515, a SIP OK message indicating a successful status may be sent from A 292 to SBC 294. The SIP OK message may include updated SDP information (e.g., a new or different media port number) associated with A 292.

In step 516, messaging loops or timing issues may occur that hinder successfully establishing a media path between A 292 and C 298. For example, after SBC 294 sends SIP re-invite messages to A 292 and C 298, A 292 may respond with a SIP OK message indicating updated SDP information associated with A 292. In response to this updated SDP information, SBC 294 may generate another SIP re-invite message to C 298 that includes the updated SDP information associated with A 292. The additional SIP re-invite message may result in a corresponding SIP OK message and SIP ACK message being exchanged. Similar messaging can occur multiple times, e.g., if an endpoint keeps updating their SDP information in response to another endpoint's updated SDP information.

It will be appreciated that FIG. 5 is for illustrative purposes and that different and/or additional messages and/or actions may be used. It will also be appreciated that various messages and/or actions described herein regarding unattended call transfer scenario 500 may occur in a different order or sequence.

Figure 6:
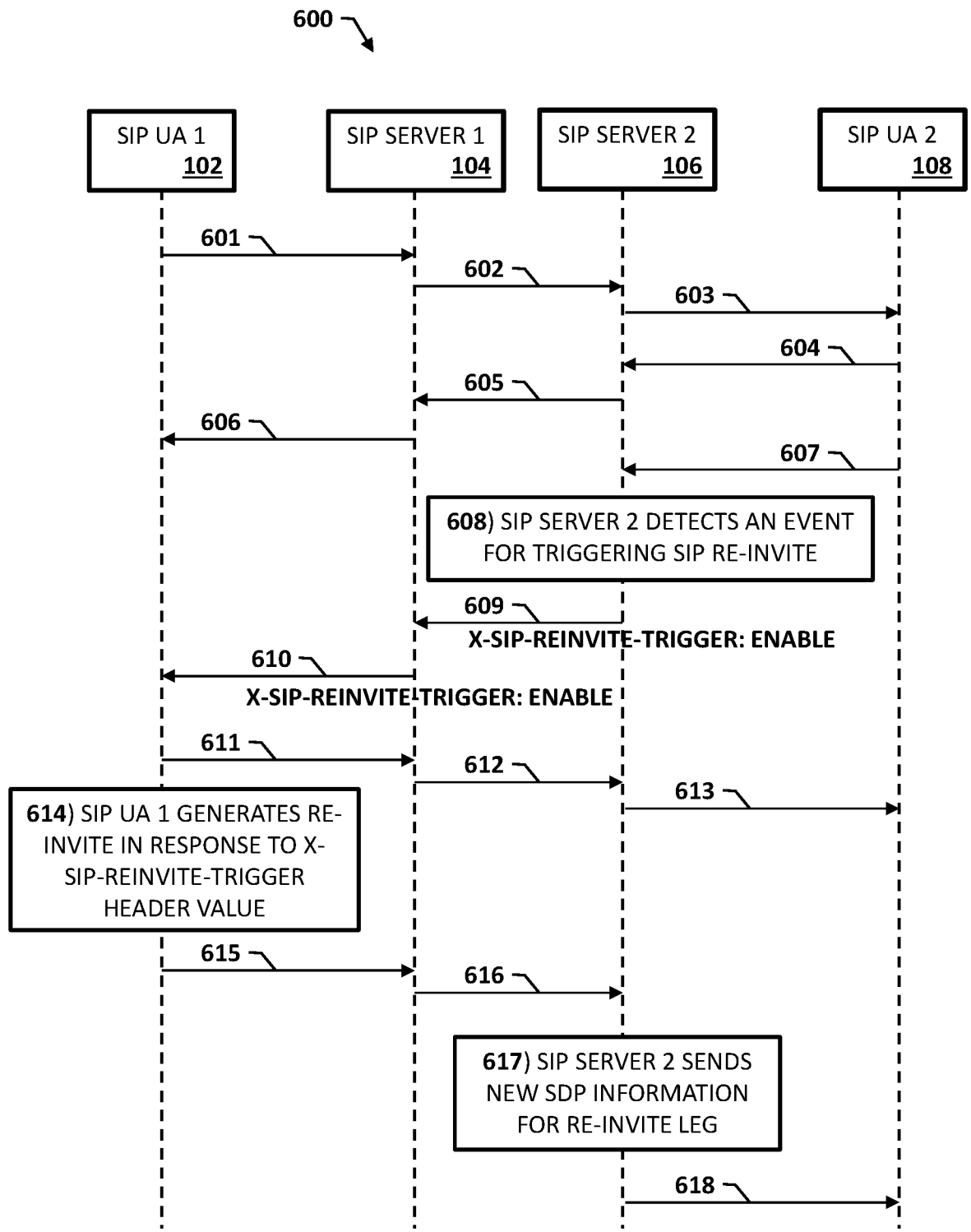
FIG. 6 is a message flow diagram illustrating a scenario involving an intermediary SIP node generating a SIP message for triggering a SIP re-invite message from an endpoint.

FIG. 6 is a message flow diagram illustrating a scenario 600 involving an intermediary SIP node generating a SIP message for triggering a SIP re-invite message from an endpoint. Scenario 600 may involve various SIP nodes, including SIP UA 1 102, SIP server 1 104, SIP server 2 106, and SIP UA 2 108, that include SM 206 or related functionality for handling (e.g., forwarding, processing, reacting to, etc.) a SIP message indicating that an endpoint should send a SIP re-invite message. For example, during scenario 600, media path characteristics (e.g., a media IP address and/or port number associated with SIP UA 2 108) may change during a SIP session or call setup involving one or more intermediary SIP nodes (e.g., SIP server 1 104, SIP server 2 106). In this example, the media path changes may cause SIP server 2 106 to send a SIP message containing a header extension (e.g., a header field value) triggering an endpoint (e.g., SIP UA 1 102) to send a SIP re-invite message, e.g., toward SIP UA 2 108. In this example, the SIP message may provide SDP information (e.g., indicating a new media IP address or port number) associated with SIP UA 2 108.

Referring to FIG. 6, in step 601, a SIP INVITE message for establishing a SIP session or call between SIP UA 1 102 and SIP UA 2 108 may be sent from SIP UA 1 102. The SIP message may provide SDP information associated with SIP UA 1 102.

In step 602, the SIP INVITE message may be received by SIP Server 1 104 and forwarded or sent to SIP server 2 106.

In step 603, the SIP INVITE message may be received by SIP Server 2 104 and forwarded or sent to SIP UA 2 108.

In step 604, in response to the SIP INVITE message, SIP UA 2 108 may send a SIP response message indicating a ringing status toward SIP UA 1 102.

In step 605, the SIP response message may be received by SIP Server 2 106 and forwarded or sent to SIP server 1 104.

In step 606, the SIP response message may be received by SIP Server 1 104 and forwarded or sent to SIP UA 1 102.

In step 607, SIP UA 2 108 may send a SIP OK message indicating a successful status toward SIP UA 1 102.

In step 608, SIP server 2 106 may receive the SIP OK message and determine that a SIP re-invite message is needed. For example, after receiving SDP information associated with SIP UA 2 108 in a received SIP OK message, SIP server 2 106 may determine that a media path IP address at SIP server 2 106 for communicating with SIP UA 2 108 needs to change.

In step 609, in response to determining that a SIP re-invite is needed, SIP server 2 106 may insert or add a SIP extension header (e.g., X-SIP-REINVITE-TRIGGER: enable) or other information to the SIP OK message before sending it toward SIP server 1 104. The SIP extension header (e.g., X-SIP-REINVITE-TRIGGER: enable) or other information may trigger an endpoint (e.g., SIP UA 1 102) to send a SIP re-invite message, e.g., toward SIP UA 2 108.

In step 610, SIP server 1 104 may receive the SIP OK message for triggering the SIP re-invite message and, since SIP server 1 104 is not an endpoint, SIP server 1 104 may send or forward the SIP OK message for triggering the SIP re-invite message onward to SIP UA 1 102.

In step 611, a SIP ACK message indicating acknowledgement of the SIP OK message and related status may be sent from SIP UA 1 102 to SIP server 1 104.

In step 612, the SIP ACK message may be sent from SIP server 1 104 to SIP server 2 106.

In step 613, the SIP ACK message may be sent from SIP server 2 106 to SIP UA 2 108.

In step 614, SIP UA 1 102 may generate a SIP re-invite message in response to receiving the SIP INVITE message from step 610. For example, SIP UA 1 102 may include SM 206 or related functionality for identifying and reacting to a SIP extension header for triggering endpoints to generate SIP re-invite messages.

In step 615, the SIP re-invite message may include SDP information associated with SIP UA 1 102 (which may or may not be different from the SDP information provided for a previously established media path) and may be sent from SIP UA 1 102 to SIP server 1 104.

In step 616, the SIP re-invite message may be forwarded or sent from SIP server 1 104 to SIP server 2 106.

In step 617, SIP server 2 106 may receive the SIP re-invite message and may include its own SDP information (e.g., an updated media path IP address), if needed.

In step 618, the SIP re-invite message may be forwarded or sent from SIP server 2 106 to SIP UA 2 108.

In some embodiments, e.g., after step 618, a media path between SIP UA 1 102 and SIP UA 2 108 may be established via SIP server 1 104 and SIP server 2 106.

In some embodiments, by using a SIP extension header (e.g., X-SIP-REINVITE-TRIGGER: enable) or other information for triggering SIP UA 1 102 to send a SIP re-invite message during scenario 600, SIP server 2 106 can avoid originating SIP re-invite message(s) to SIP UA 1 102 or SIP UA 2 108, thereby avoiding various connection related issues (e.g., loops or timing issues) discussed above with regard to FIG. 3.

It will be appreciated that FIG. 6 is for illustrative purposes and that different and/or additional messages and/or actions may be used. It will also be appreciated that various messages and/or actions described herein regarding scenario 600 may occur in a different order or sequence.

Figure 7:
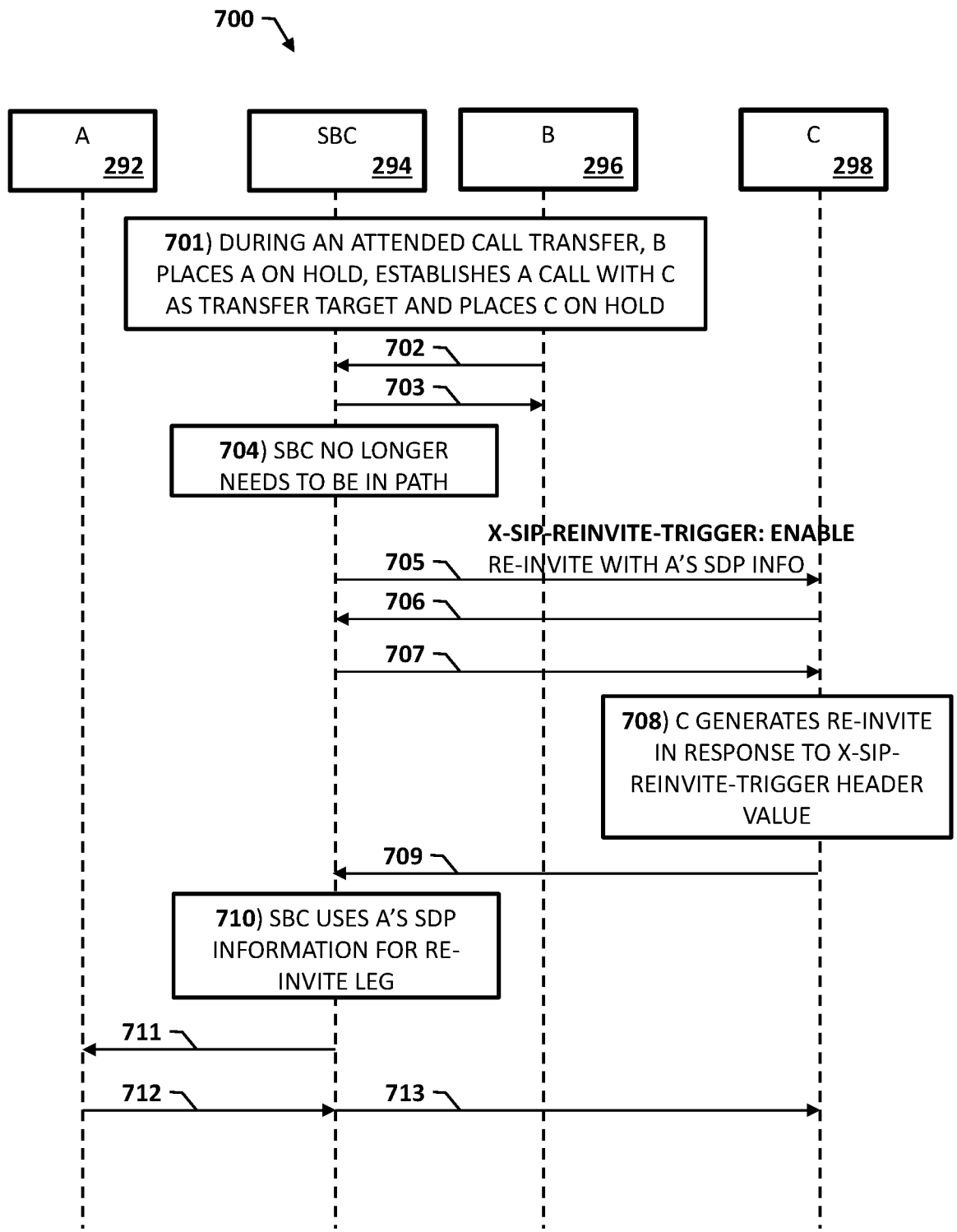
FIG. 7 is a message flow diagram illustrating an attended call transfer scenario involving a SIP message for triggering a SIP re-invite message from an endpoint.

FIG. 7 is a message flow diagram illustrating an attended call transfer scenario 700 involving a SIP message for triggering a SIP re-invite message from an endpoint. Attended call transfer scenario 700 may involve various SIP nodes, including A 292, SBC 294, B 296, and C 298, that include SM 206 or related functionality for handling (e.g., forwarding, processing, reacting to, etc.) a SIP message indicating that an endpoint should send a SIP re-invite message. For example, during attended call transfer scenario 700, SBC 294 may send a SIP message containing a header extension (e.g., a header field value) indicating that an endpoint (e.g., C 298) should send a SIP re-invite message, e.g., toward A 292. In this example, the SIP message may provide A's SDP information to C 298 for when C 298 sends the SIP re-invite message toward A 292.

Referring to FIG. 7, e.g., prior to step 701, a SIP session or call between A 292 and B 296 may be established utilizing a media path from A 292 to SBC 294 and from SBC 294 to B 296.

In step 701, after the call is established, B 296 acting as the transferor may initiate an attended call transfer. As part of the attended call transfer and prior to B 296 sending a SIP REFER request message to SBC 294, B 296 may place the transferee, A 292, on hold, establish a call with the transfer target, C 298, to alert the transfer target to the impending transfer and then place C 298 on hold.

In step 702, a SIP REFER request message for transferring a call from B 296 to C 298 may be sent from B 296 to SBC 294. The SIP REFER message may include a Replaces header with a Refer-to field indicating C 298 and a Refer-by field indicating B 296.

In step 703, a SIP REFER response message indicating that the REFER request was accepted may be sent from SBC 294 to B 296.

In step 704, SBC 294 may determine that it no longer needs to be in the media path between the transfer target (e.g., C 298) and the transferee (e.g., A 292). For example, SBC 294 may determine that C 298 and A 292 is within the same network, domain, or realm.

In step 705, a SIP re-invite message may be sent to C 298 and may include a SIP extension header (e.g., X-SIP-REINVITE-TRIGGER: enable) or other information for triggering an endpoint (e.g., C 298) to send a SIP re-invite message, e.g., toward A 292. The SIP message may indicate that it was referred by B 296 and may include SDP information associated with A 292.

In step 706, a SIP OK message indicating a successful status may be sent from SBC 294 to C 298.

In step 707, a SIP ACK message indicating acknowledgement of C's status may be sent from SBC 294 to C 298.

In step 708, C 298 may generate a SIP re-invite message in response to receiving the SIP INVITE message from step 705. For example, C 298 may include SM 206 or related functionality for identifying and reacting to a SIP extension header for triggering endpoints to generate SIP re-invite messages.

In step 709, the SIP re-invite message may include C's SDP information and may be sent from C 298 to SBC 294.

In step 710, SBC 294 may receive the SIP re-invite message and, recognizing that it does not need to be in the media path, SBC 294 may not change or modify C's SDP information in the message.

In step 711, the SIP re-invite message may be forwarded or sent to C 298 from SBC 294.

In step 712, a SIP OK message indicating a successful status may be sent from A 292 to SBC 294. The SIP OK message may also include updated SDP information (e.g., a new media port number) associated with A 292.

In step 713, the SIP OK message may be forwarded or sent to C 298 from SBC 294.

In some embodiments, e.g., after step 713, a media path between A 292 and C 298 may be established.

In some embodiments, by using a SIP extension header (e.g., X-SIP-REINVITE-TRIGGER: enable) or other information for triggering C 298 to send a SIP re-invite message during attended call transfer scenario 700, SBC 294 can avoid originating SIP re-invite message(s) to A 292 or C 298, thereby avoiding various connection related issues (e.g., loops or timing issues) discussed above with regard to FIG. 4.

It will be appreciated that FIG. 7 is for illustrative purposes and that different and/or additional messages and/or actions may be used. It will also be appreciated that various messages and/or actions described herein regarding attended call transfer scenario 700 may occur in a different order or sequence.

Figure 8:
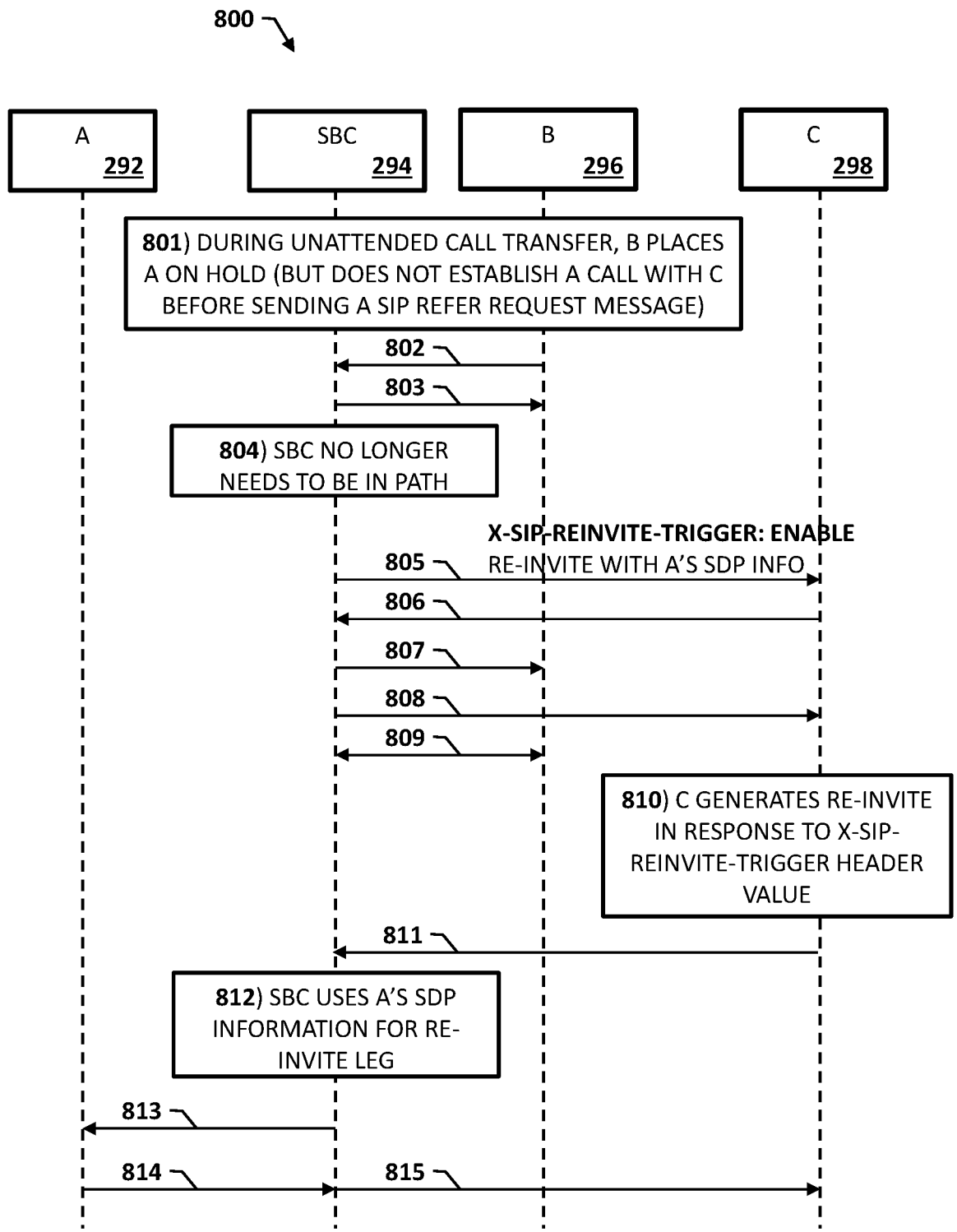
FIG. 8 is a message flow diagram illustrating an unattended call transfer scenario involving a SIP message for triggering a SIP re-invite message from an endpoint.

FIG. 8 is a message flow diagram illustrating an unattended call transfer scenario 800 involving a SIP message for triggering a SIP re-invite message from an endpoint. Unattended call transfer scenario 800 may involve various SIP nodes, including A 292, SBC 294, B 296, and C 298, that include SM 206 or related functionality for handling (e.g., forwarding, processing, reacting to, etc.) a SIP message indicating that an endpoint should send a SIP re-invite message. For example, during unattended call transfer scenario 800, SBC 294 may send a SIP message containing a header extension (e.g., a header field value) indicating that an endpoint (e.g., C 298) should send a SIP re-invite message, e.g., toward A 292. In this example, the SIP message may provide A's SDP information to C 298 for when C 298 sends the SIP re-invite message toward A 292.

Referring to FIG. 8, e.g., prior to step 801, a SIP session or call between A 292 and B 296 may be established utilizing a media path from A 292 to SBC 294 and from SBC 294 to B 296.

In step 801, after the call is established, B 296 acting as the transferor may initiate an unattended call transfer. As part of the attended call transfer, B 296 may place the transferee, A 292, on hold (but may not establish a call with the transfer target, C 298) before B 296 sends a SIP REFER request message to SBC 294.

In step 802, a SIP REFER request message for transferring a call from B 296 to C 298 may be sent from B 296 to SBC 294. The SIP REFER message may include a Replaces header with a Refer-to field indicating C 298 and a Refer-by field indicating B 296.

In step 803, a SIP REFER response message indicating that the REFER request was accepted may be sent from SBC 294 to B 296.

In step 804, SBC 294 may determine that it no longer needs to be in the media path between the transfer target (e.g., C 298) and the transferee (e.g., A 292). For example, SBC 294 may determine that C 298 and A 292 is within the same network, domain, or realm.

In step 805, a SIP re-invite message may be sent to C 298 and may include a SIP extension header (e.g., X-SIP-REINVITE-TRIGGER: enable) or other information for indicating that C 298 is to send a SIP re-invite message toward A 292. The SIP message may indicate that it was referred by B 296 and may include SDP information associated with A 292.

In step 806, a SIP OK message indicating a successful status may be sent from SBC 294 to C 298.

In step 807, a SIP NOTIFY message indicating transfer of one leg of a call from B 296 to C 298 may be sent from SBC 294 to B 296.

In step 808, a SIP ACK message indicating acknowledgement of C's status may be sent from SBC 294 to C 298.

In step 809, messages (e.g., a SIP BYE message and a SIP OK message) between SBC 294 to B 296 may be exchanged for ending the call involving B 296.

In step 810, C 298 may generate a SIP re-invite message in response to receiving the SIP INVITE message from step 805. For example, C 298 may include SM 206 or related functionality for identifying and reacting to a SIP extension header for triggering endpoints to generate SIP re-invite messages.

In step 811, the SIP re-invite message may include C's SDP information and may be sent from C 298 to SBC 294.

In step 812, SBC 294 may receive the SIP re-invite message and, recognizing that it does not need to be in the media path, SBC 294 may not change or modify C's SDP information in the message.

In step 813, the SIP re-invite message may be forwarded or sent to C 298 from SBC 294.

In step 814, a SIP OK message indicating a successful status may be sent from A 292 to SBC 294. The SIP OK message may also include updated SDP information (e.g., a new media port number) associated with A 292.

In step 815, the SIP OK message may be forwarded or sent to C 298 from SBC 294.

In some embodiments, e.g., after step 815, a media path between A 292 and C 298 may be established.

In some embodiments, by using a SIP extension header (e.g., X-SIP-REINVITE-TRIGGER: enable) or other information for triggering C 298 to send a SIP re-invite message during unattended call transfer scenario 800, SBC 294 can avoid originating SIP re-invite message(s) to A 292 or C 298, thereby avoiding various connection related issues (e.g., loops or timing issues) discussed above with regard to FIG. 5.

It will be appreciated that FIG. 8 is for illustrative purposes and that different and/or additional messages and/or actions may be used. It will also be appreciated that various messages and/or actions described herein regarding unattended call transfer scenario 800 may occur in a different order or sequence.

Figure 9:
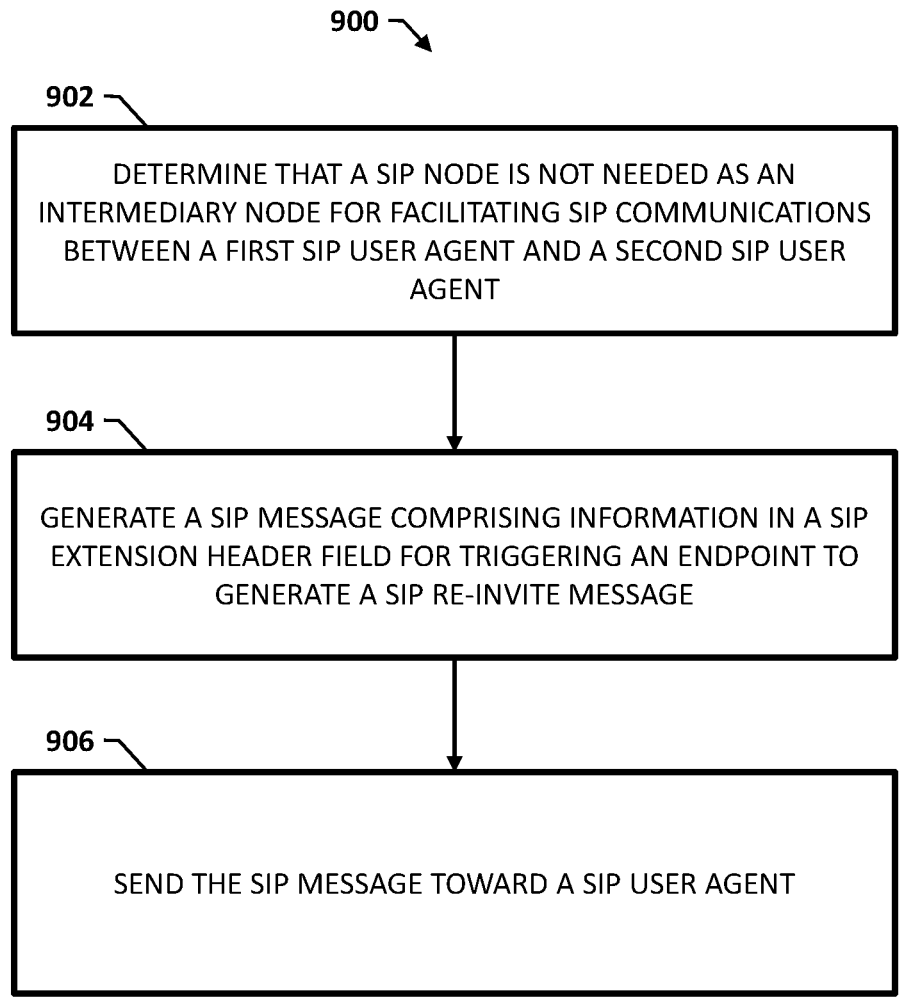
FIG. 9 is a flow chart illustrating an example process for triggering a SIP re-invite message.

FIG. 9 is a diagram illustrating an example process 900 for triggering a SIP re-invite message. In some embodiments, example process 900 described herein, or portions (e.g., steps) thereof, may be performed at or performed by SIP UA 1 102, SIP server 1 104, SIP server 2 106, SIP UA 1 108, SIP node 200, SM 206, and/or another module or node.

Referring to process 900, in step 902, it may be that the SIP node is not needed as an intermediary node for facilitating SIP communications between a first SIP user agent and a second SIP user agent.

In step 904, a SIP message including information in a SIP extension header field for triggering an endpoint (e.g., the first SIP user agent or the second SIP user agent) to generate a SIP re-invite message may be generated.

In some embodiments, the information in the SIP extension header field may include a field value indicating that a SIP re-invite message is to be triggered.

In some embodiments, the SIP message may be generated after determining that an intermediary SIP node is to be removed from a media path of the SIP session or after determining that media path characteristics (e.g., a media IP address) of the SIP session has changed.

In step 906, the SIP message may be sent toward the first SIP user agent.

In some embodiments, a second SIP node may be configured for receiving the SIP message and sending the SIP message toward the first SIP user agent. In such embodiments, the second SIP node may send the SIP message toward the first SIP user agent after determining that the information in the SIP extension header field is for triggering an endpoint to generate a SIP re-invite message and after determining that the second intermediary SIP node is not an endpoint, e.g., the second SIP node may be an intermediary node, like SIP Server 1 104.

In some embodiments, a first SIP user agent may be configured for receiving the SIP message; determining that the information in the SIP extension header field is for triggering the endpoint to generate the SIP re-invite message; generating the SIP re-invite message; and sending the SIP re-invite message toward the second SIP user agent.

In some embodiments, a SIP node that triggered an endpoint to the send the SIP re-invite message may be configured for receiving the SIP re-invite message; adding or modifying SDP information in the SIP re-invite message; and sending the SIP re-invite message toward the second SIP user agent.

In some embodiments, the SIP node may include a SIP proxy, an SBC, a SIP server, or a SIP B2BUA.

In some embodiments, the SDP information may include an IP address associated with the SIP node for a media path between the first SIP user agent and the second SIP user agent.

In some embodiments, determining that the SIP node is not needed as an intermediary node for facilitating SIP communications between the first SIP user agent and the second SIP user agent may occur after a media path characteristic (e.g., IP address and port number changes, a call transfer, etc.) of the SIP session changes.

In some embodiments, determining that the SIP node is not needed as an intermediary node for facilitating SIP communications between the first SIP user agent and the second SIP user agent may be related to an unattended call transfer or an attended call transfer. For example, during a call transfer, a call leg may be transferred from a second SIP user agent to a third SIP user agent that is in the same network as a first SIP user agent and an SBC in the media path is no longer needed.

It will be appreciated that process 900 is for illustrative purposes and that different and/or additional actions may be used. It will also be appreciated that various actions described herein may occur in a different order or sequence.

It should be noted that SIP UA 1 102, SIP server 1 104, SIP server 2 106, SIP UA 1 108, SIP node 200, SM 206, and/or functionality described herein may constitute a special purpose computing device. Further, SIP UA 1 102, SIP server 1 104, SIP server 2 106, SIP UA 1 108, SIP node 200, SM 206, and/or functionality described herein can improve the technological field of SIP communications. For example, SIP node 200 (e.g., SBC 294) may include SM 206 and SIP node 200 and/or SM 206 may be capable of generating a SIP message comprising a header parameter or field or other information for triggering an endpoint (e.g., A 292) to send a SIP re-invite message toward a destination, e.g., another SIP UA or endpoint (e.g., C 298).

In this example, SIP node 200 and/or SM 206 therein may also insert relevant SDP information or other information in the SIP re-invite message, e.g., if this message traverses SIP node 200 to reach its destination. Continuing with this example, by using a SIP extension header (e.g., X-SIP-REINVITE-TRIGGER: enable) or other information for triggering an endpoint to send a SIP re-invite message, SIP node 200 can avoid originating SIP re-invite message(s) to SIP endpoints, thereby avoiding various connection related issues (e.g., loops or timing issues) discussed above.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for triggering a session initiation protocol (SIP) re-invite message, the method comprising:
at a session initiation protocol (SIP) node, wherein the SIP node is an intermediary node in a media path established between a first SIP user agent and a second SIP user agent:
determining that the SIP node is no longer needed as the intermediary node in the media path or that an IP address associated with the SIP node used for the media path needs to change;
in response to the determining, generating a SIP message comprising information in a SIP extension header field that triggers the first SIP user agent to generate a SIP re-invite message, wherein the SIP re-invite message is configured for modifying the established media path and the SIP extension header comprises a SIP ReInvite triqger field that carries an enable field value that selectively triggers SIP endpoints but not non-SIP endpoints to generate SIP re-invite messages; and
sending the SIP message toward the first SIP user agent.

2. The method of claim 1 comprising:
at a second SIP node in the media path:
receiving the SIP message; and
sending the SIP message toward the first SIP user agent.

3. The method of claim 2 wherein the second SIP node sends the SIP message toward the first SIP user agent after determining that the information in the SIP extension header field is for triggering the first SIP user agent to generate a SIP re-invite message and after determining that the second SIP node is not the first SIP user agent.

4. The method of claim 1 comprising:
at the first SIP user agent:
receiving the SIP message;
determining that the information in the SIP extension header field is for triggering the first SIP user agent to generate the SIP re-invite message;
generating the SIP re-invite message; and
sending the SIP re-invite message toward the second SIP user agent.

5. The method of claim 1 comprising:
at the SIP node:
receiving the SIP re-invite message;
adding or modifying session description protocol (SDP) information in the SIP re-invite message; and
sending the SIP re-invite message toward the second SIP user agent.

6. The method of claim 5 wherein the SDP information includes a different IP address associated with the SIP node for an updated media path between the first SIP user agent and the second SIP user agent.

7. The method of claim 1 wherein determining that the SIP node is not needed as an intermediary node in the media path or that an IP address associated with the SIP node used for the media path needs to change occurs after a media path characteristic of the SIP session changes.

8. The method of claim 1 wherein the information in the SIP extension header field includes a field value indicating that the SIP re-invite message is to be triggered.

9. The method of claim 1 wherein the SIP node includes a SIP proxy, a session border controller (SBC), a SIP server, or a SIP back-to-back user agent (B2BUA).

10. A system for triggering a session initiation protocol (SIP) re-invite message, the system comprising:
a processor;
a memory; and
a session initiation protocol (SIP) node comprising the processor and the memory, wherein the SIP node is an intermediary node in a media path established between a first SIP user agent and a second SIP user agent, wherein the SIP node is configured for:
determining that the SIP node is no longer needed as the intermediary node in the media path or that an IP address associated with the SIP node used for the media path needs to change;
in response to the determining, generating a SIP message comprising information in a SIP extension header field that triggers the first SIP user agent to generate a SIP re-invite message, wherein the SIP re-invite message is configured for modifying the established media path, wherein the SIP extension header comprises a SIP ReInvite triqger field that carries an enable field value that selectively triggers SIP endpoints but not non-SIP endpoints to generate SIP re-invite messages; and
sending the SIP message toward the first SIP user agent.

11. The system of claim 10 comprising:
a second SIP node in the media path configured for:
- receiving the SIP message; and
- sending the SIP message toward the first SIP user agent.

12. The system of claim 11 wherein the second SIP node sends the SIP message toward the first SIP user agent after determining that the information in the SIP extension header field is for triggering the first SIP user agent to generate a SIP re-invite message and after determining that the second SIP node is not the first SIP user agent.

13. The system of claim 10 wherein the first SIP user agent is configured for:
- receiving the SIP message;
- determining that the information in the SIP extension header field is for triggering the first SIP user agent to generate the SIP re-invite message;
- generating the SIP re-invite message; and
- sending the SIP re-invite message toward the second SIP user agent.

14. The system of claim 10 wherein the SIP node is configured for:
- receiving the SIP re-invite message;
- adding or modifying session description protocol (SDP) information in the SIP re-invite message; and
- sending the SIP re-invite message toward the second SIP user agent.

15. The system of claim 14 wherein the SDP information includes a different IP address associated with the SIP node for an updated media path between the first SIP user agent and the second SIP user agent.

16. The system of claim 10 wherein determining that the SIP node is not needed as an intermediary node in the media path or that an IP address associated with the SIP node used for the media path needs to change occurs after a media path characteristic of the SIP session changes.

17. The system of claim 10 wherein determining that the SIP node is not needed as an intermediary node in the media path is related to an unattended call transfer or an attended call transfer, wherein a call leg is transferred from the second SIP user agent to a third SIP user agent that is in the same network as the first SIP user agent and wherein the SIP node is a session border controller.

18. The system of claim 10 wherein the information in the SIP extension header field includes a field value indicating that the SIP re-invite message is to be triggered.

19. The system of claim 10 wherein the SIP node includes a SIP proxy, a session border controller (SBC), a SIP server, or a SIP back-to-back user agent (B2BUA).

20. A non-transitory computer readable medium having stored thereon executable instructions that when executed by at least one processor of at least one computer cause the at least one computer to perform steps comprising:
at a session initiation protocol (SIP) node, wherein the SIP node is an intermediary node in a media path established between a first SIP user agent and a second SIP user agent:
- determining that the SIP node is no longer needed as the intermediary node in the media path or that an IP address associated with the SIP node used for the media path needs to change;
- in response to the determining, generating a SIP message comprising information in a SIP extension header field that triggers the first SIP user agent to generate a SIP re-invite message, wherein the SIP re-invite message is configured for modifying the established media path, wherein the SIP extension header comprises a SIP ReInvite triqqer field that carries an enable field value that selectively triggers SIP endpoints but not non-SIP endpoints to generate SIP re-invite messages; and
- sending the SIP message toward the first SIP user agent.

* * * * *

UNITED STATES PATENT AND TRADEMARK OFFICE
CERTIFICATE OF CORRECTION

| | |
|---|---|
| PATENT NO. | : 12,218,989 B2 |
| APPLICATION NO. | : 17/508338 |
| DATED | : February 4, 2025 |
| INVENTOR(S) | : Juneja |

It is certified that error appears in the above-identified patent and that said Letters Patent is hereby corrected as shown below:

In the Specification

In Column 2, Line 20, delete "endpoint" and insert -- endpoint. --, therefor.

In Column 2, Lines 20-28, delete "In some embodiments involving one or more aspect of the subject matter described herein, the method for triggering a SIP re-invite message includes, at the first SIP user agent, receiving the SIP message including header information; determining that the header information is for triggering the endpoint to generate the SIP re-invite message; generating the SIP re-invite message; and sending the SIP re-invite message toward the second SIP user agent." and insert the same on Column 2 Line 21, as a new paragraph, therefor.

In Column 3, Line 18, delete "endpoint" and insert -- endpoint. --, therefor.

In Column 5, Lines 20-21, delete "ReInvitee" and insert -- ReInvite --, therefor.

In Column 8, Line 25, delete "sent send" and insert -- send --, therefor.

In the Claims

In Column 19, Line 63, in Claim 1, delete "triqqer" and insert -- trigger --, therefor.

In Column 20, Line 62, in Claim 10, delete "triqqer" and insert -- trigger --, therefor.

In Column 22, Line 32, in Claim 20, delete "triqqer" and insert -- trigger --, therefor.

Signed and Sealed this
Sixth Day of May, 2025

Coke Morgan Stewart
*Acting Director of the United States Patent and Trademark Office*